Figure 1:
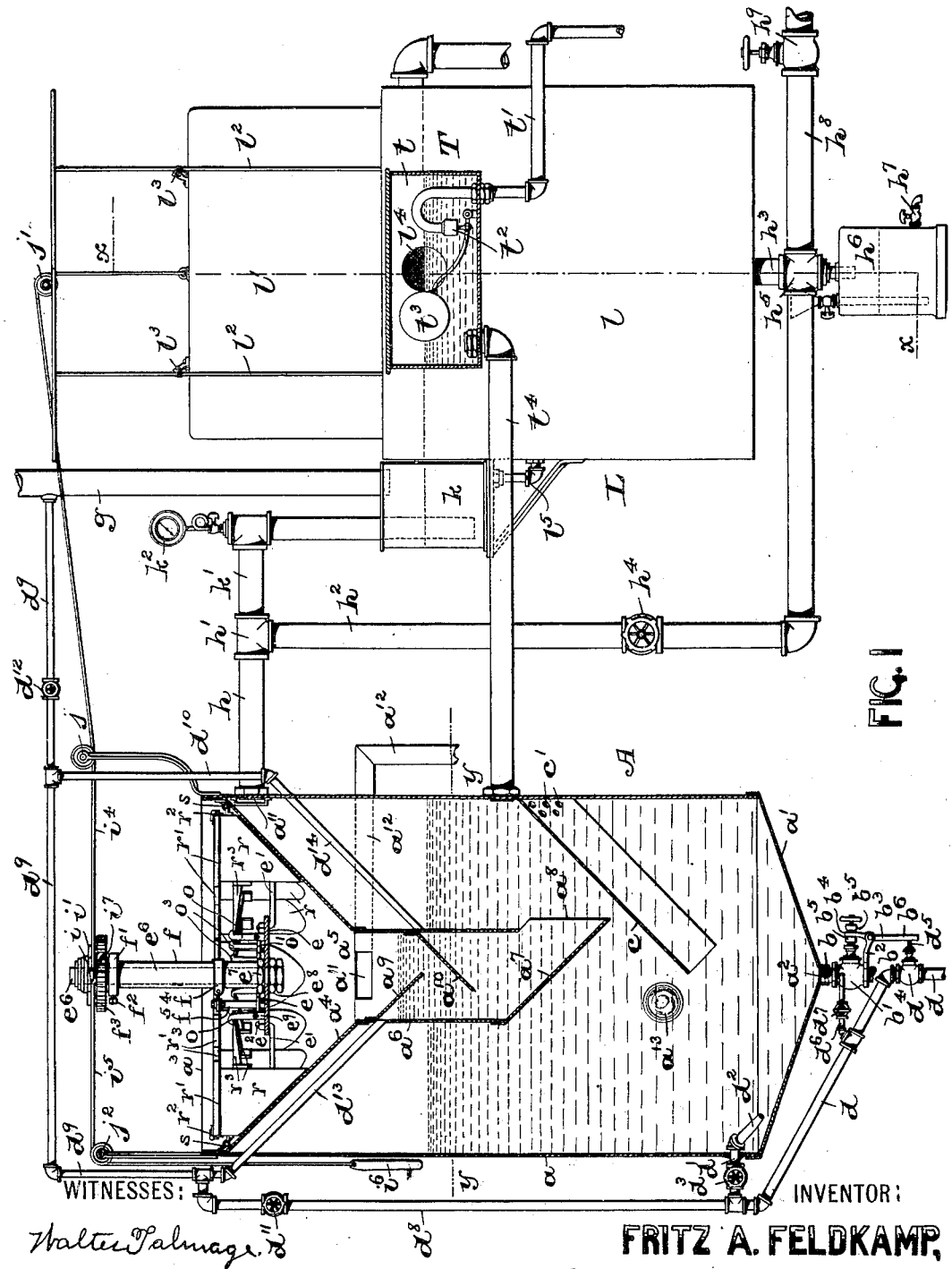

No. 649,442. Patented May 15, 1900.
F. A. FELDKAMP.
ACETYLENE GAS GENERATOR.
(Application filed Mar. 30, 1899.)

(No Model.) 5 Sheets—Sheet 1.

WITNESSES:
Walter Talmage
Wm. H. Canfield Jr.

INVENTOR:
FRITZ A. FELDKAMP,
BY
Fred'k C. Fraentzel,
ATTORNEY

THE NORRIS PETERS CO., PHOTO-LITHO., WASHINGTON, D. C.

No. 649,442. Patented May 15, 1900.
F. A. FELDKAMP.
ACETYLENE GAS GENERATOR.
(Application filed Mar. 30, 1899.)
(No Model.) 5 Sheets—Sheet 3.

WITNESSES:
Walter H. Talmage
Wm. H. Canfield Jr.

INVENTOR:
FRITZ A. FELDKAMP,
BY Fred'k C. Fraentzel,
ATTORNEY

No. 649,442. Patented May 15, 1900.
F. A. FELDKAMP.
ACETYLENE GAS GENERATOR.
(Application filed Mar. 30, 1899.)

(No Model.) 5 Sheets—Sheet 4.

WITNESSES:
Walter H. Talmage.
Wm. H. Canfield, Jr.

INVENTOR:
FRITZ A. FELDKAMP,
BY
Fred C. Fraentzel,
ATTORNEY

No. 649,442. Patented May 15, 1900.
F. A. FELDKAMP.
ACETYLENE GAS GENERATOR.
(Application filed Mar. 30, 1899.)
(No Model.) 5 Sheets—Sheet 5.
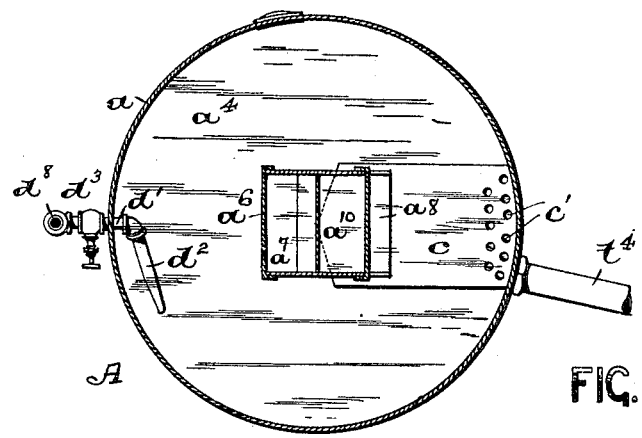
FIG. 5
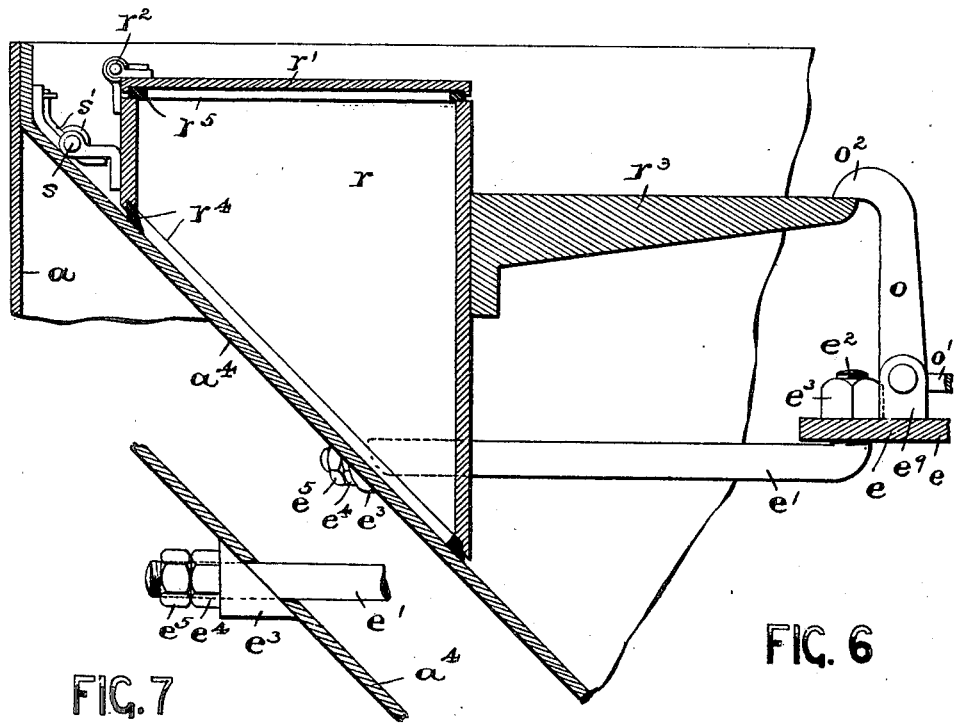
FIG. 6
FIG. 7
WITNESSES:
Walter H. Talmage.
Wm. H. Caufield Jr.
INVENTOR:
FRITZ A. FELDKAMP,
BY
Fred C. Fraentzel
ATTORNEY

UNITED STATES PATENT OFFICE.

FRITZ A. FELDKAMP, OF NEWARK, NEW JERSEY, ASSIGNOR TO THE BRILLIANT GAS LIGHT COMPANY, OF NEW JERSEY.

ACETYLENE-GAS GENERATOR.

SPECIFICATION forming part of Letters Patent No. 649,442, dated May 15, 1900.

Application filed March 30, 1899. Serial No. 711,042. (No model.)

*To all whom it may concern:*

Be it known that I, FRITZ A. FELDKAMP, a subject of the Emperor of Germany, residing at Newark, in the county of Essex and State of New Jersey, have invented certain new and useful Improvements in Acetylene-Gas Generators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention is in the nature of improvements in acetylene-gas generators, and has reference more particularly to improvements in the construction of apparatus and the several arrangements and combinations of parts set forth and claimed by me in an application for Letters Patent filed November 30, 1898, Serial No. 697,818, and allowed March 7, 1899.

My present invention therefore has for its special purpose to provide a novel construction of apparatus for generating acetylene gas, in which calcium carbid can be used in the form of lumps, which are deposited from time to time in predetermined quantities in the water to generate the gas in proper proportions to its consumption. The apparatus is of such construction that when the carbid is introduced into the water it is dissolved, whereby only the required volume of gas is produced in proper proportion to the consumption of the gas at the burner or burners in the pipe connections distributed through the building.

A further object of this invention is to provide an apparatus constructed to contain a large quantity of water in the generating-tank of the apparatus to remove all surplus heat due to generation, whereby the temperature of the gas will remain normal, and also to produce an apparatus in which there can be no residue of calcium carbid, and hence no possibility of having at any time a supply of incandescent carbid or a surplus of heated carbid remaining within the generator-tank, as in the constructions of apparatus in which water is dropped upon the carbid or in which the carbid is dipped into the water.

One of the essential objects of this invention is to provide a novel construction of apparatus in which the parts of the generating apparatus are so arranged that there can be no admission of air to the generated gas, thereby preventing any danger of explosion from hydrogen phosphide that may be present, and at the same time the acetylene gas leaves the generating-tank under normal conditions and normal temperature, whereby the use of additional cooling devices and other devices for removing tar products or other impurities found in the gas generated in other forms of apparatus are entirely unnecessary, thereby simplifying the general construction and arrangements of the various parts of the apparatus.

With these several objects in view my invention consists in the general construction of apparatus and in the novel arrangements and combinations of the devices and parts, all of which will be hereinafter fully described, and finally embodied in the clauses of the claim.

The invention is clearly illustrated in the accompanying drawings, in which—

Figure 2:
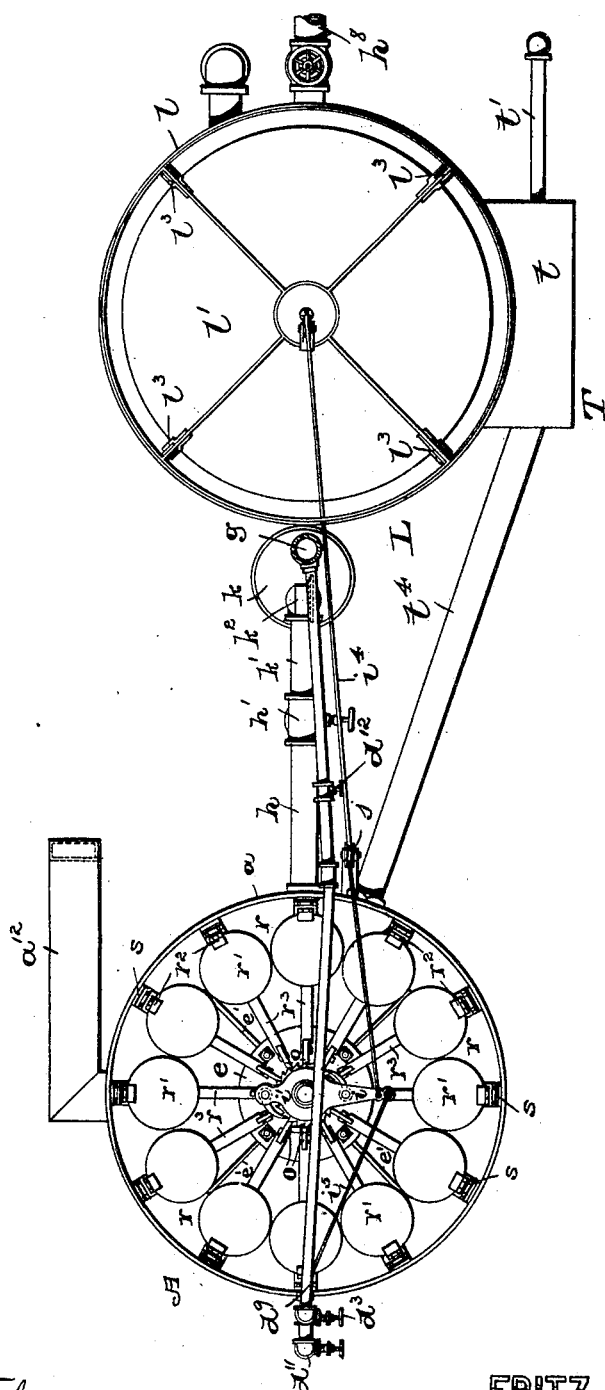
Figure 3:
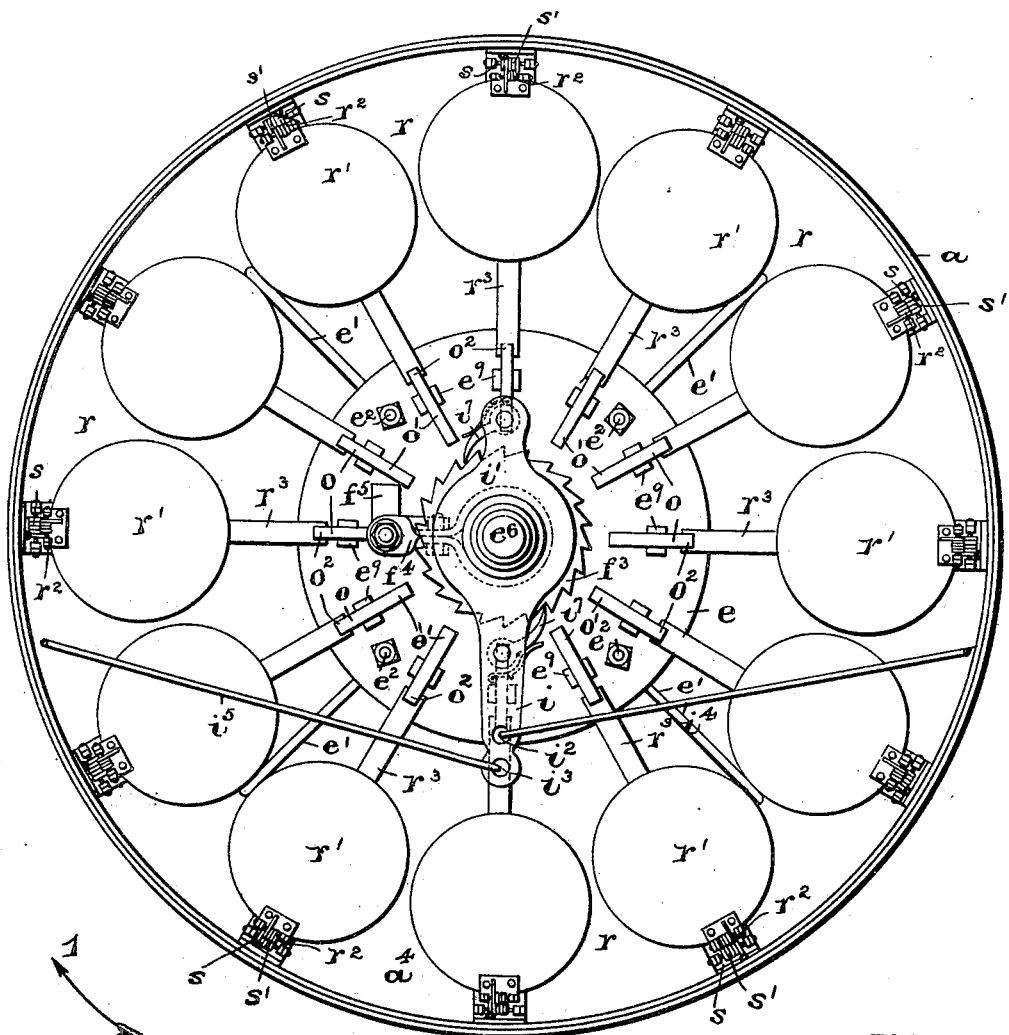
Figure 4:
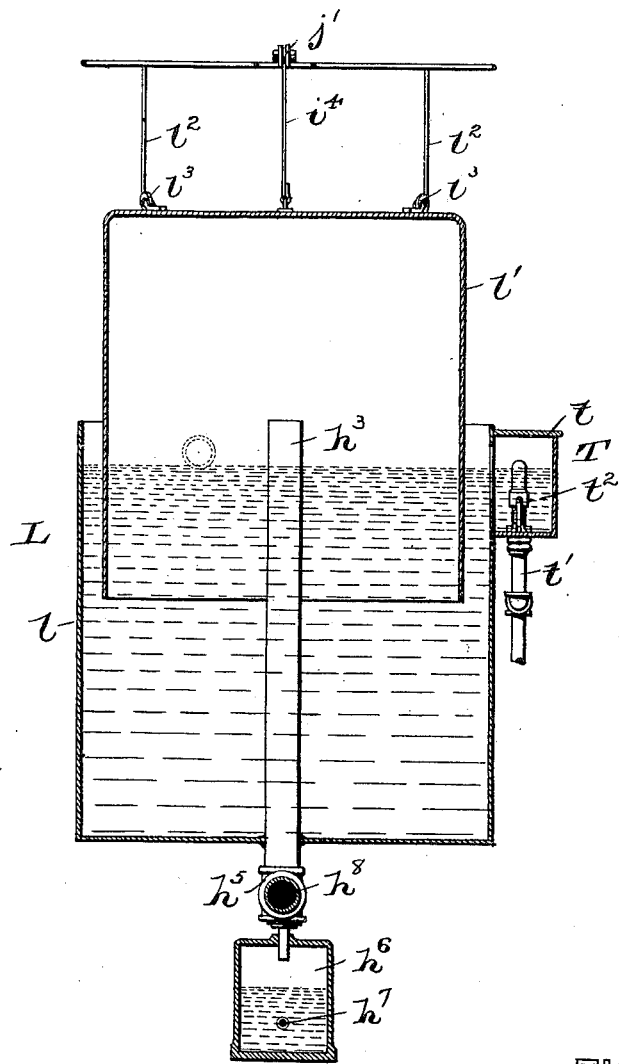

Figure 1 is a longitudinal vertical section of a generating apparatus and a side elevation of a gasometer, the pipe connections, and the several devices that go to make up the present invention. Fig. 2 is a plan view of the several parts represented in the said Fig. 1. Fig. 3 is a top view of the generator-tank on an enlarged scale. Fig. 4 is a vertical cross-section of the gasometer and parts, said section being taken on line $x$ in Fig. 1. Fig. 5 is a horizontal section of the generator-tank, said section being taken on line $y$ in Fig. 1. Figs. 6 and 7 are detail views, on an enlarged scale, of certain of the parts illustrated in said Figs. 1, 2, and 3.

Similar letters of reference are employed in all of the said above-described views, and in which—

A indicates a suitably-constructed generating-tank, consisting, essentially, of a body $a$, provided with a conical bottom $a'$, in which there is a suitable opening $a^2$, having an outlet-pipe $b$, provided with a shut-off cock $b'$. The said tank is open at the top, as at $a^3$, and has secured in said open end in any suitable manner a funnel-shaped top piece $a^4$, which is provided at the bottom with a central opening $a^5$, preferably of a rectangular outline, and terminates in a downwardly-projecting duct or chute $a^6$, which is also of a rectangular shape. The lower portion of said duct $a^6$ is closed by an inclined bottom $a^7$ and has an opening $a^8$ in one side, whereby the lumps of carbid are deposited upon a $\wedge$-shaped guard $c$, secured to the inner surface of said tank A, as clearly indicated in Figs. 1 and 5, and which serves the purpose of throwing the carbid to either side and away from beneath said opening $a^8$ in the duct $a^6$ to avoid any possibility of the generated acetylene gas passing through said opening into the said duct $a^6$. Said duct $a^6$ extends down into the water in said tank A, whereby it is water-sealed, and hence prevents the passage of any outside air into the generating-chamber A, as will be clearly evident. Said guard $c$ may also be provided with holes or perforations $c'$ to permit the passage of the generated gas therethrough into the space above the water in said tank A. As an extra precaution said duct $a^6$ may be provided with inclined guards $a^9$ and $a^{10}$, arranged substantially as illustrated in said Fig. 1, which act as traps and serve to catch and hold up any slight quantity of acetylene gas that may possibly have passed from the body of the tank A into the duct during the passage therethrough of the calcium carbid from the funnel-top $a^4$ in the manner hereinafter described. Said duct or chute $a^6$ may also be provided with an overflow-opening, as $a^{11}$, with which is connected a discharge-pipe $a^{12}$, leading to the outside of the tank A and connected with the sewer. Said tank A is also provided in the side thereof with a glass $a^{13}$ to permit the inspection of the lower portion of said tank, and whereby it becomes possible to note any deposits of lime or other foreign matter in the water. In one side of said tank A is a fresh-water-supply pipe $d'$, which is connected with the main supply-pipe $d$ and has a nozzle $d^2$ for admitting the water into the bottom of the tank A, said nozzle being set at an acute angle to the inner side of the body $a$, whereby the water admitted will whirl around upon the conical bottom $a'$ and stir up the deposits of lime thereon. In said pipe $d'$ is a suitable valve or cock $d^3$, and in the pipe $d$ is a valve or cock $d^4$, which is preferably of the slide-valve construction.

As illustrated in Fig. 1, I have secured upon the valve-casing $b'$ in the pipe $b$ a bracket or arm $b^2$, with which is pivotally connected a lever $b^3$, said lever having a bifurcated end $b^4$ arranged between two annular shoulders $b^5$ on the valve-stem of the shut-off cock or valve $b'$ and has a portion $b^6$ in operative engagement with a spring-actuated stem $d^5$ of the valve or cock $d^4$. The arrangement and construction of these parts are such that when the valve or cock $b'$ is opened said lever $b^3$ will open the water-supply valve $d^4$, whereby when the water is drawn from the tank A through the pipe $b$ a fresh supply of water is at the same time admitted through the pipes $d$ $d'$ and the nozzle $d^2$ to stir up the deposits in the bottom of said tank A and at once flush out said tank and clear it of any impurities. At the same time the volume of water withdrawn through the pipe $b$ is replaced by a fresh supply of water from the main water-supply pipe, as will be clearly evident. When the cock or valve $b'$ is again closed, the valve or cock $d^4$ also closes automatically. Said pipe $d$ may also be in communication with the valve $b'$ through a pipe $d^6$ and a valve $d^7$ in said pipe $d^6$ to flush out the valve $b'$ when necessary. I may also connect with the main supply-pipe $d$ certain water-conducting pipes $d^8$, $d^9$, and $d^{10}$, said pipe $d^8$ having a shut-off cock $d^{11}$ and pipe $d^9$ a shut-off cock $d^{12}$. As illustrated in said Fig. 1, pipes $d^{13}$ and $d^{14}$ may also be connected with said water-supply just mentioned, said pipes $d^{13}$ and $d^{14}$ passing through the body $a$ of the tank A and terminating in the duct $a^6$, beneath the guards $a^9$ and $a^{10}$, for flushing out said duct when the cock or valve $d^{11}$ is opened and the cock or valve $d^{12}$ is closed, as will be clearly understood from an inspection of said Fig. 1. When said cock $d^{11}$ is closed, the cock $d^{12}$ can be left open, in which case the pipes $d^{13}$ and $d^{14}$ can be employed for conducting any acetylene gas that may have collected under the guards $a^9$ and $a^{10}$ into the pipes $d^9$ and $d^{10}$, and thence into an exhaust-pipe $g$, which leads above the roof of the building in which the apparatus is placed.

Centrally arranged in the funnel-shaped top piece $a^4$ is a disk or plate $e$, which is provided with several holes in which I have arranged and secured by means of nuts or in any other suitable manner the ends $e^2$ of certain stay bolts or rods $e'$, having their opposite ends passed through holes in the sides of the top piece $a^4$ and held in position by means of washers $e^3$ and nuts $e^4$ and $e^5$, as illustrated more especially in Figs. 6 and 7. Said disk $e$ has a centrally-arranged rod $e^6$, which extends upwardly, as shown, and which is secured to said disk, preferably by means of nuts $e^7$ and $e^8$; but it may be otherwise secured to said disk. Rotatively arranged upon the said rod $e^6$ is a tube or pipe $f$, which has its lower end resting lightly upon the said nut $e^7$, hereinabove mentioned. At or near the upper end of this tube is a collar $f'$, secured thereto by means of a set-screw $f^2$, and $f^3$ is a suitable ratchet-wheel, which is also suitably secured to said tube or pipe $f$ in position directly above said collar $f'$. Loosely but rotatively arranged on that end of the rod $e^6$ which extends above the said tube or pipe $f$ is the eye portion $i'$ of a rod or arm $i$, which has a pair of holes $i^2$ and $i^3$ near its free end, substantially as illustrated. Attached to the perforation or hole $i^2$ of the said arm $i$ is a flexible connection $i^4$, which passes over suitably-placed wheels $j$ and $j'$, respectively, arranged on the tank A and upon the gas-holder $l'$ of a gas-receiver L, and $i^5$ is another flexible connection attached in the hole or perforation $i^3$ of said arm $i$ and passing over a wheel $j^2$. To the free end of said flexible connection $i^5$ is secured a weight $i^6$, substantially as shown.

L indicates the gas-receiver above mentioned, comprising a suitable water-tank $l$, which is open at the top and is provided with any desirable number of uprights $l^2$. The said gas-holder $l'$ above mentioned is movably arranged between these uprights and is open at the bottom and closed at the top. The open part of said holder $l'$ is arranged in the water in said tank $l$, and upon the top of said holder are a number of grooved wheels $l^3$, which are in rolling contact with the uprights $l^2$ to properly guide the vertical movement of the gas-holder as it moves up and down by the admission or emission of gas into or from the said holder.

Connected with an outlet $a^{11}$ in the side of the tank A and beneath the cone-shaped top piece $a^4$ is a pipe $h$, having a T-fitting $h'$. Connected with said fitting $h'$ is a downwardly-extending pipe $h^2$, which leads into the bottom of the tank or reservoir $l$ and terminates in an upright pipe $h^3$, leading to a point above the water in the gas-holder $l'$. Said pipe $h^2$ is provided with a stop-cock $h^4$ for shutting off the communication between the tank A and the reservoir $l$ in case of repairs or for other reasons, and connected with a T-fitting $h^5$ in the said pipe may be a drip-pot $h^6$ for catching any water caused by condensation, said pot being provided with an outlet-cock $h^7$ for drawing off the water when necessary. Leading from said fitting $h^5$ in the pipe $h^2$ is a pipe $h^8$, provided with a stop-cock $h^9$, and in said pipe may be arranged the burner or burners for consuming the gas. Thus it will be evident that the acetylene gas may be drawn direct from the tank A through the pipes $h$ $h^2$ into the pipe $h^8$ for direct consumption, or when more gas is generated than is actually burned at the time of such generation of the gas then the gas also passes through the pipe $h^3$ into the water-sealed tank $l'$, from which it is withdrawn as required at the burner or burners in the pipe $h^8$.

Connected with the T-fitting $h'$, hereinabove mentioned, is a pipe $k'$, which leads into the bottom of the usual form of gas-trap $k$, arranged in the escape-pipe $g$, that leads to the roof of the building. Said pipe $k'$ may also be provided with a suitable pressure-gage $k^2$, substantially as shown. Thus it will be seen that an oversupply of gas produced in the tank A will pass through the pipe $k'$ into the trap $k$, and thence through the escape-pipe $g$ into the open air, thereby overcoming all danger of explosion.

When the gas-holder $l'$ of the gas-receiver L has been raised by the gas, the rod $i$ will stand approximately in the position indicated in Fig. 3. Now as the gas is being withdrawn by consumption at the burner or burners the lowering of said gas-holder $l'$ will pull on said flexible connection $i^4$, which will cause a horizontal motion of the rod or arm $i$, and the latter being provided with spring-actuated pawls or dogs $i^7$, which are in operative engagement with the ratchet-teeth of the ratchet-wheel $f^3$, will cause an intermittent rotary motion of the tube or pipe $f$ upon the said rod $e^6$ and will bring a spur or foot $f^5$, connected with a clamping-band $f^4$, secured upon said tube or pipe $f$, in operative engagement with a finger $o'$ of an arm or post $o$, which is pivotally arranged in a bearing $e^9$ on the disk or plate $e$, as clearly represented in Figs. 1 and 3 of the drawings. Arranged concentric with the said disk or plate $e$ on the inner conical surface of the top piece $a^4$ are any desirable number of hinged and spring-actuated carbid-holding receptacles $r$, and of course the number of bearings $e^9$ upon the stationary disk $e$ and the number of posts or arms $o$ in said bearings will correspond to the number of such carbid-holding receptacles. Each receptacle $r$ has a hinged cover $r'$, which can be raised by the operator for filling the receptacle with the carbid, the inclined surface of the top piece $a^4$ forming the bottom of each receptacle $r$. Said covers $r'$, as will be seen from Figs. 3 and 6, may be provided with spring-actuated hinges $r^2$, which hold said covers $r'$ down upon the receptacles, as will be evident. Each receptacle $r$ is also secured to the inner surface of the top piece $a^4$ by means of a hinge $s$, each hinge being provided with a suitably-constructed spring $s'$, the normal tendency of which is to cause the receptacle $r$ to be thrown upwardly and backwardly in the manner hereinafter set forth in detail and whereby the open bottom of each receptacle $r$ can be held away from the inclined surface of the top piece $a^4$. In order that each receptacle $r$ may be held in the positions indicated in the several figures of the drawings and more especially in Fig. 6, each receptacle is provided with an arm $r^3$, with the forward end of which can be brought in holding or locked engagement a hook-shaped end or nosing $o^2$ of each post or arm $o$. In this manner each receptacle $r$ can be held in its closed position and is thereby adapted to receive a predetermined quantity of carbid or other gas-producing substance. The body of each receptacle $r$ is also provided with a rubber gasket $r^4$, and the covers $r'$ are also provided with rubber gaskets $r^5$. After all the receptacles $r$ have been filled with the carbid or other gas-producing substance, as stated, the operator by hand causes one of the receptacles $r$ to deposit its contents into the water in the body $a$ of the tank A. Immediately acetylene gas is generated and the same passes into the gas-receiver L, causing the gas-holder $l'$ to rise. This upward movement of the holder $l'$ permits the weight $i^6$ and flexible connection $i^5$ to pull the rod $i$ accordingly in the direction of the arrow 1 in Fig. 3, and the dogs or pawls $i^7$ will pass over the proper number of ratchet-teeth of the wheel $f^3$. As soon as the said gas-holder $l'$ is lowered owing to the consumption of the gas then the ratchet-wheel $f^3$ will receive a partial rotary motion, whereby the spur or foot $f^5$ will be brought in operative sliding engagement with the finger $o'$ on the next pivotal post $o$ to disengage the nosing of said post from its holding engagement with the arm $r^3$ of the next adjacent receptacle $r$. The spring $s'$, connected with the hinge of said receptacle $r$, will immediately cause said receptacle to be thrown back, and the carbid or other gas-producing substance therein will pass down the inclined surface of the top piece $a^4$ into the duct $a^5$ through the opening $a^8$ therein upon the guard $c$, to be deflected and deposited into the bottom of the tank A, where the lumps of carbid are dissolved and generate the acetylene gas. The carbid which I prefer to use is prepared in such a manner that it will not begin to generate the gas upon its immediate contact with the water, and hence there will be no gas formed until the carbid has been safely deposited in the bottom of the tank A. From an inspection of Fig. 1 of the drawings, it will be seen that the inner construction of the tank A and its parts is such that the bubbles of gas will rise and pass through the water on the outer side of the chute or duct $a^6$ and into the top of the body $a$ beneath the top piece $a^4$, where the gas is collected. Thus the tank A may be safely provided with an open top piece, as $a^4$, and without the least danger of any gas escaping into the room.

During the operation of the alternate rising and lowering of the gas-holder $l'$ the mechanism for actuating the receptacles $r$ is intermittently actuated, and from time to time each receptacle $r$ is emptied of its contents, whereby the proper quantity of carbid or other gas-producing substance is deposited in the water in the body $a$ to generate gas in sufficient volume and in proper proportion to the consumption of the gas at the burner or burners in the pipe $h^8$.

In order that the height of the water in the tank A, in the gas-receiver L, and in the trap $k$ may be automatically maintained at the same height, the reservoir $l$ may be connected, by means of an opening $l^4$, with the water-box $t$ of a regulating device T. Said device T is connected with a water-supply pipe $t'$, which has a valve $t^2$, arranged and constructed to be opened and closed by a float $t^3$ in any well-known manner. Said tank or box $t$ is also connected with the generating-tank A by a pipe $t^4$, and $l^5$ is a pipe which establishes a communication between the gas-receiver L and the trap $k$, whereby the same height of the water will at all times be maintained in said generator-tank A, the said gas-receiver L, and in the trap $k$, as will be clearly understood.

From the above description it will be evident that I have devised a simple and operative apparatus for generating acetylene or other gas in the proper proportions to the consumption of the gas, and the consequent danger of explosion due to an oversupply of the gas is entirely obviated.

I am fully aware that many changes may be made in the arrangements and combinations of the parts and in the several operating mechanisms, as well as in the details of the construction thereof, without departing from the scope of my present invention. Hence I do not limit my invention to the exact arrangements and combinations of the parts as herein described, and illustrated in the accompanying drawings, nor do I limit myself to the exact details of the construction of the parts.

Having thus described my invention, what I claim is—

1. An apparatus for generating acetylene or other gas, comprising a body constructed to contain water, a funnel-shaped top piece in said body, having a central opening, a duct connected with said opening, an inclined bottom in said duct, and having a discharge-opening in one side, and a guard $c$ in said body, substantially as and for the purposes set forth.

2. An apparatus for generating acetylene or other gas, comprising a body constructed to contain water, a funnel-shaped top piece in said body, having a central opening, a duct connected with said opening, an inclined bottom in said duct, and having a discharge-opening in one side, an inclined guard or guards in said duct, forming a trap, and an inclined guard $c$ in said body, substantially as and for the purposes set forth.

3. An apparatus for generating acetylene or other gas, comprising a body constructed to contain water, a funnel-shaped top piece in said body, having a central opening, a duct connected with said opening, and extending into the water, and a pipe or pipes extending through said body and leading into said duct, substantially as and for the purposes set forth.

4. An apparatus for generating acetylene or other gas, comprising a body constructed to contain water, a funnel-shaped top piece in said body, having a central opening, a duct connected with said opening, and extending into the water, a water-supply pipe $d$ and an inlet-pipe $d'$, and a pipe or pipes in communication with said main water-supply pipe, extending through said body and leading into said duct, substantially as and for the purposes set forth.

5. An apparatus for generating acetylene or other gas, comprising a body constructed to contain water, a funnel-shaped top piece in said body, having a central opening, a duct connected with said opening, and extending into the water, a guard or guards in said duct, forming a trap, and a pipe or pipes extending through said body and leading into said duct, substantially as and for the purposes set forth.

6. An apparatus for generating acetylene or other gas, comprising a body constructed to contain water, a funnel-shaped top piece in said body, having a central opening, a duct connected with said opening and extending into the water, a guard or guards in said duct, forming a trap, and a water-supply-pipe $d$, and inlet-pipe $d'$, and a pipe or pipes in communication with said main supply-pipe extending through said body and leading into said duct, substantially as and for the purposes set forth.

7. In an apparatus for generating acetylene or other gas, the combination, with the body thereof, constructed to contain water, of a discharge-pipe in said body, a valve or cock in said discharge-pipe, a water-supply pipe leading into said body, a valve or cock in said supply-pipe, and means between the valve or cock in the discharge-pipe and the valve or cock in the supply-pipe, for actuating both valves or cocks at the same time, substantially as and for the purposes set forth.

8. In an apparatus for generating acetylene or other gas, the combination, with the body thereof, constructed to contain water, of a discharge-pipe in said body, and a valve or cock in said pipe, a water-supply pipe $d$, and a pipe $d^6$ between said pipe $d$ and said cock or valve in the discharge-pipe, with which said pipe $d^6$ is connected to flush out said cock or valve, substantially as and for the purposes set forth.

9. In an apparatus for generating acetylene or other gas, the combination, with the body thereof constructed to contain water, of a gas-receiver, having a water-sealed gas-holder, and a water-regulating device connected with said parts, for maintaining the same height of water in said body and said gas-holder, substantially as and for the purposes set forth.

10. In an apparatus for generating acetylene or other gas, the combination, with the body thereof constructed to contain water, of a gas-receiver having a water-sealed gas-holder, and a water-regulating device connected with said gas-receiver, and a means of communication between said water-regulating device and said body, for maintaining the same height of water in said body and said gas-holder, substantially as and for the purposes set forth.

11. In an apparatus for generating acetylene or other gas, the combination, with the body thereof constructed to contain water, of a gas-receiver, having a water-sealed gas-holder, pipe connections between said body and gas-receiver for conducting the gas from said body to said gas-holder, a gas-trap $k$ connected with said pipe, and a water communication between said trap and gas-receiver, substantially as and for the purposes set forth.

12. In an apparatus for generating acetylene or other gas, the combination, with the body thereof constructed to contain water, of a gas-receiver, having a water-sealed gas-holder, pipe connections between said body and gas-receiver for conducting the gas from said body to said gas-holder, a gas-trap $k$ connected with said pipe, a water communication between said trap and gas-receiver, and a water-regulating device connected with said parts, for maintaining the same height of water in said body, gas-holder and said trap, substantially as and for the purposes set forth.

13. In an apparatus for generating acetylene or other gas, the combination, with the body thereof constructed to contain water, of a gas-receiver, having a water-sealed gas-holder, pipe connections between said body and gas-receiver for conducting the gas from said body to said gas-holder, a gas-trap $k$ connected with said pipe, a water communication between said trap and gas-receiver, a water-regulating device connected with said gas-receiver, and a means of communication between said water-regulating device and said body, for maintaining the same height of water in said body, said gas-holder and said trap, substantially as and for the purposes set forth.

In testimony that I claim the invention set forth above I have hereunto set my hand this 27th day of March, 1899.

FRITZ A. FELDKAMP.

Witnesses:
FREDK. C. FRAENTZEL,
WALTER H. TALMAGE.